May 9, 1967  E. F. JOYCE 3RD  3,318,362
COVER FOR CHEST-TYPE CABINET
Filed Nov. 23, 1964  2 Sheets-Sheet 1

EDWARD F. JOYCE 3RD
INVENTOR.

BY Rudolph J. Juick
ATTORNEY

May 9, 1967  E. F. JOYCE 3RD  3,318,362
COVER FOR CHEST-TYPE CABINET
Filed Nov. 23, 1964  2 Sheets-Sheet 2
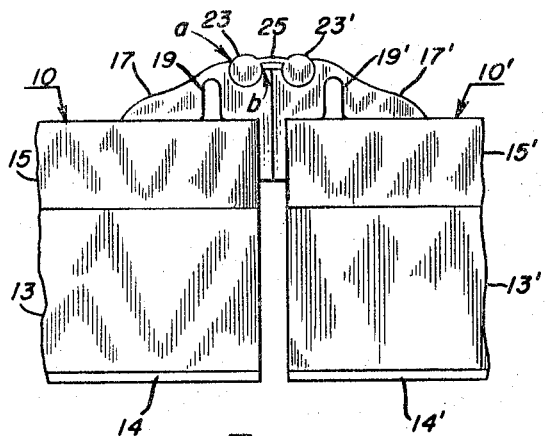
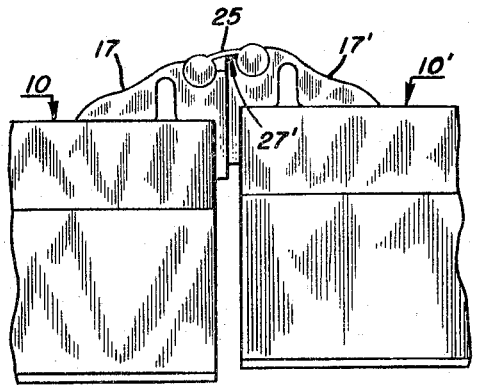
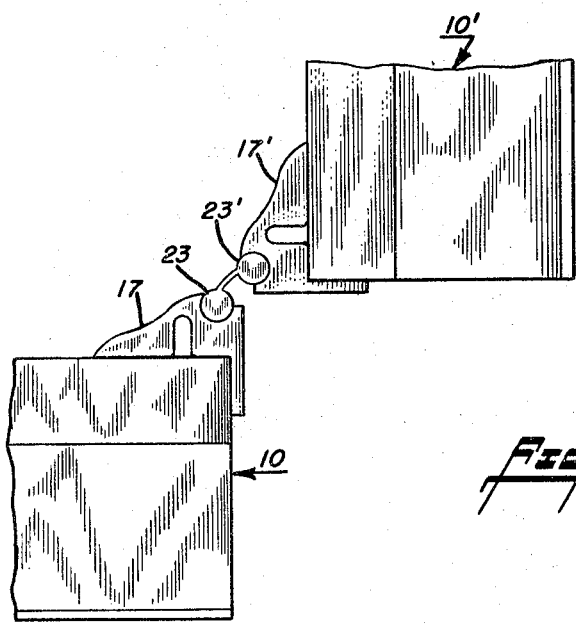
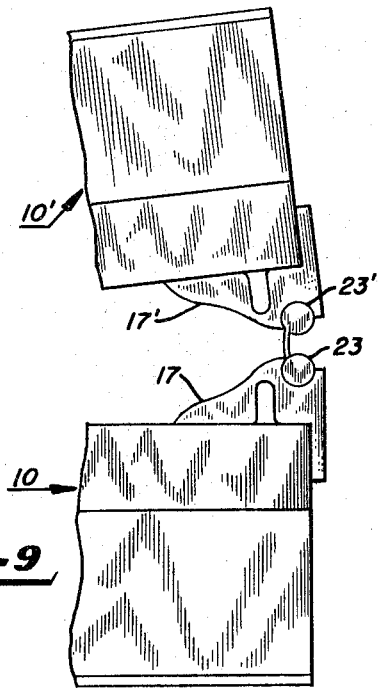
EDWARD F. JOYCE 3RD
INVENTOR.
BY
ATTORNEY

United States Patent Office 3,318,362
Patented May 9, 1967

3,318,362
COVER FOR CHEST-TYPE CABINET
Edward F. Joyce 3rd, 205 Rockaway St.,
Boonton, N.J. 07005
Filed Nov. 23, 1964, Ser. No. 412,964
1 Claim. (Cl. 160—229)

This invention relates to covers for chest-type cabinets and more particularly to covers comprising a pair of lids pivotally secured together and adapted to close access openings formed in the top of a cabinet.

Covers of the class to which this invention is directed serve as removable closures for generally rectangular access openings formed in the top of ice cream cabinets and the like. Such covers comprise two similar lids secured together by a hinge, whereby the one lid may be rotated relative to the other to afford access to a desired section of the cabinet. At the same time, the cover is removable from the cabinet as a unit. Each lid is constructed and arranged to provide a fairly tight closure with the cabinet top to minimize loss of refrigeration.

Numerous local laws require that covers for ice cream cabinets be so constructed that water accumulated on the lids cannot enter into the cabinet, through the hinge, as the lids are rotated to the open position. Conventional piano hinges are not satisfactory for this purpose. Consequently, it has been the practice to make the hinge of two metal members, each member being secured to a lid and the members being joined together by a rubber center strip. However, such hinges have a limited, useful life due to deterioration of the rubber, which deterioration is accelerated upon contact with water, fatty acids, etc.

An object of this invention is the provision of a dual cover for ice cream cabinets and the like, which cover is of rugged construction, has a long operating life and which meets the requirements of laws governing the storage and dispensing of bulk ice cream.

An object of this invention is the provision of a dual cover comprising two lids joined together by an all metal hinge affording at least 180 degree rotation of one lid relative to the other while preventing the seepage of water therethrough.

An object of this invention is the provision of a cover comprising a pair of lids joined together by an all metal hinge constructed and arranged to permit a limited lateral displacement of one lid relative to the other, thereby providing a self-leveling action for proper seating of the covers on a supporting surface which may not be perfectly flat.

An object of this invention is the provision of an all metal hinge for pivotally joining together a pair of lids, which hinge comprises a pair of identical, reversely disposed members provided with elongated bearing sockets and a pintle having cylindrical side edges slidably and rotatably disposed within the bearing sockets.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claim appended hereto.

In the drawings wherein like reference characters denote like parts in the several views:

FIGURE 6 is fragmentary side elevational view similar to FIGURE 2 but drawn to an enlarged scale and showing the lids in monoplanar, or level position;

FIGURE 7 is similar to FIGURE 6 but showing one lid vertically displaced relative to the other lid; and FIGURES 8 and 9 are similar to FIGURE 6 and respectively showing the right lid partially and fully rotated, relative to the left lid.

Figure 1:
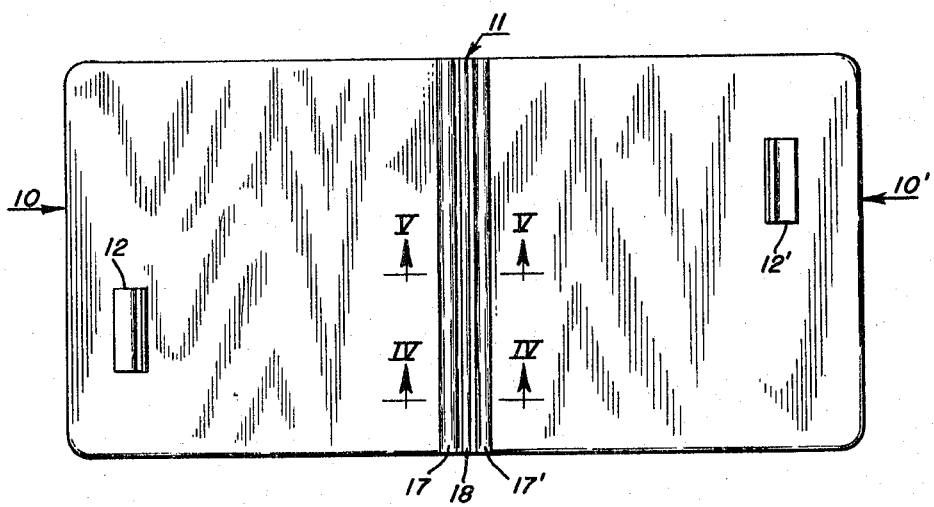
FIGURE 1 is a top plan view of a dual lid cover and hinge made in accordance with this invention.
Figure 2:
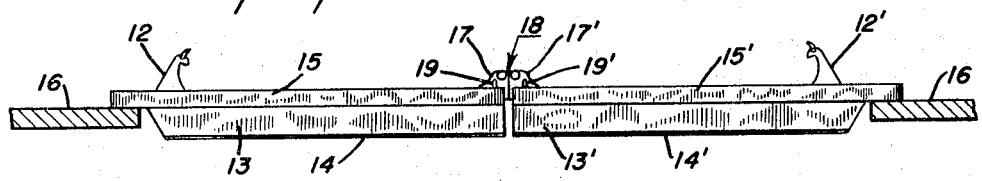
FIGURE 2 is a corresponding side elevational view and showing a portion of the lid supporting surface of a cabinet.

Referring now to FIGURES 1 and 2, there is shown a cover consisting of two lids 10 and 10' pivotally joined together by an elongated hinge 11, and having handles 12, 12' secured to the respective upper surfaces. The lid 10 comprises a relatively thick body portion 13 sandwiched between an inner plate 14 and an outer plate 15. The body portion 13, made of a suitable temperature-insulating material, has an integral, upper flange which extends outwardly from three sides thereof and the upper plate 15 has its three edges folded over to substantially enclose such flange. Thus, the extended, three edges of the upper plate form a seat for supporting the lid on the top surface of a cabinet, the lateral portions of such top surface being identified by the numeral 16 in FIGURE 2. The other lid 10' is of similar construction and corresponding parts are identified by like reference numerals primed. Preferably, the metal portions of the lids are made of stainless steel or aluminum.

Figure 4:
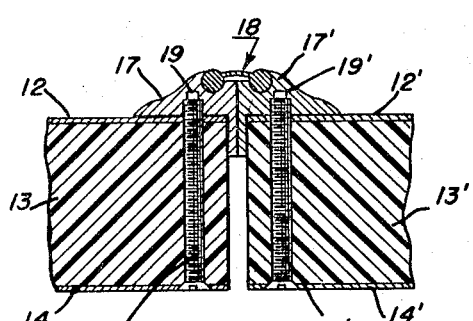
FIGURE 4 is an enlarged, fragmentary cross-sectional view taken along the line IV—IV of FIGURE 1.

The hinge comprises two aluminum members 17, 17' which are of identical configuration and, therefore, are made by the extrusion process which results in economy of manufacture. These members are pivotally secured together by an elongated pintle 18, as will be described in detail hereinbelow, said pintle also being made of extruded aluminum. Each of the hinge members 17 and 17' may be attached to the associated lid in any suitable manner. One convenient and economical way of securing the hinge members to the lid will now be described with specific reference to FIGURE 4, which is an enlarged, fragmentary cross-sectional view taken along the line IV—IV of FIGURE 1. It is here pointed out that longitudinal channels 19, 19' are formed in the respective hinge members 17, 17', which channels run the full length of the hinge. Each lid is provided with spaced holes for accommodating fastening screws, one set of such screws 20, 20' being visible in this particular view. These screws have tapered ends which cut partial threads in the opposed walls defining the associated channels. Several such fastening screws, spaced along the hinge, are sufficient to retain each hinge member secured attached to the associated lid.

Figure 3:
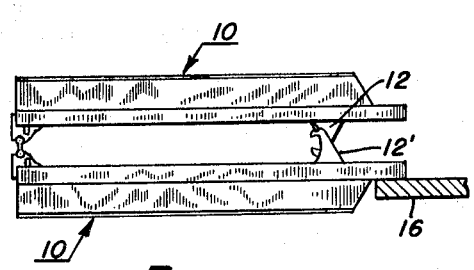
FIGURE 3 is a similar side elevational view and showing one lid rotated to the open position.

The pintle 18 secures the two hinge members 17, 17' together and serves as a floating pivot whereby either lid may be rotated relative to the other lid as is shown, for example, in FIGURE 3. Each of the handles 12, 12' has a rubber insert extending therefrom to prevent marring of the lid surfaces.

Figure 5:
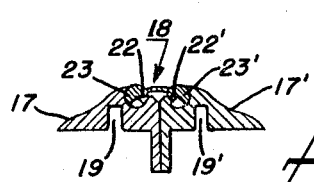
FIGURE 5 is a transverse cross-sectional view of the hinge, taken along the line V—V of FIGURE 1 and showing the arrangement to prevent the pintle from sliding out of the bearing sockets in the finished cover.

The pintle 18 is slidably inserted into operative position and thereafter axial movement of the pintle relative to the two hinge members is limited by the arrangement shown in FIGURE 5, which is an enlarged, fragmentary cross-sectional view of the hinge taken along the line V—V of FIGURE 1. Two transverse notches 22, 22', are formed in the respective cylindrical side edges 23, 23' of the pintle, such notches being formed approximately midway of the hinge ends and each having an arcuate length of 120–150 degrees. After the pintle has been inserted into position, but before the lids are fastened to the hinge members, that point of each hinge member which is immediately adjacent the notches is offset into the associated notch by means of a suitable tool. Thus, the three members forming the hinge are free to rotate relative to each other but cannot become separated in an axial direction.

Reference now is made to FIGURE 6, which is a fragmentary, side elevational view drawn to an enlarged scale. Each of the hinge members 17, 17' has formed therein a longitudinal, arcuate socket, conforming to and receiving the associated, cylindrical side edges 23, 23' of the pintle, which side edges are joined by an integral, arcuate bridge portion 25. Referring specifically to the socket formed in the hinge member 17, the cross-sectional, angular extent of this socket, defined by the longitudinal edges $a$ and $b$, is somewhat greater than 180 degrees. Consequently, lateral separation of the cylindrical side edge 23 and the member 17 cannot occur while, at the same time, substantial relative rotation between these members can take place about the axis of the member 23. The extent of such relative rotation is limited in one direction by the bridge portion 25 striking the edge $a$, and in the other direction by the bridge portion striking the ledge having the edge $b$. As stated hereinabove, the two hinge members are of identical configuration and the other cylindrical side edge 23', of the pintle, is similarly confined and rotatable within the socket of the hinge member 17'.

Attention is directed to the fact that normally there is a vertical spacing between the pintle bridge portion 25 and each of the underlying, proximate ledges of the two hinge members. When the two lids 10 and 10' are supported on a perfectly flat surface, as represented in FIGURE 6, the two spacings are equal. Importantly, these spacings permit a certain amount of lateral movement of one lid relative to the other. As shown in FIGURE 7, the lid 10' is displaced vertically relative to the lid 10 to the point where the bridge portion 25 engages the horizontal ledge 27' of the hinge member 17'. While the extent of such sliding displacement of the two lids, or knee action, is of limited extent, it is, nevertheless, significant and results in the lids forming a proper closure for the cabinet opening in cases wherein the lid-supporting surface of the particular cabinet is not perfectly flat.

FIGURE 8 is a fragmentary, side elevational view corresponding to FIGURE 6 but showing the position of the three hinge members when the lid 10' is rotated about 90 degrees relative to the lid 10. FIGURE 9 is a similar view showing the lid 10' rotated to the maximum extent relative to the lid 10. It will be apparent that as the lid 10' is rotated from the closed position shown in FIGURE 6 to the fully-open position shown in FIGURE 9, there is a simultaneous relative rotation between the individual cylindrical side edges 23', 23 and the associated hinge members 17', 17. Since the three hinge members each are unitary members there is no possibility of water seeping from the outer surfaces of the lids, through the hinge and into the cabinet, regardless of the relative positions of the lids. As a practical matter, the amount of water which may collect on the lids is relatively small and, further, the lids are generally opened fairly rapidly whereby even a large quantity of surface water would overlie the cylindrical side edges of the pintle for only a very brief period of time. The main problem lies in the gradual accumulation of moisture on the hinge surfaces, particularly on days when the humidity is relatively high. In a hinge constructed as hereindescribed, the extruded hinge members can be held to very close tolerances so that there is a very close fit between the cylindrical side edges of the pintle and the sockets formed in the other two hinge members. Consequently, there is but very little possibility of moisture entering between the sockets and the contained side portions of the pintle and, in any event, such moisture can only flow out of the hinge ends, which hinge ends do not overlie the combined opening.

Having now described the invention, those skilled in this art will be able to make various changes and modifications without thereby departing from the spirit and scope of the invention as recited in the following claim.

I claim:

A cover comprising a pair of lids; a first metal hinge member engaging one lid and having a circular socket formed therein which socket extends the full length of said member; a second metal hinge member engaging the other lid and having a similar socket formed therein; a longitudinal channel formed in and extending the full length of each of the hinge members; a metal pintle coupling together the two hinge members, said pintle having cylindrical side edges disposed in and rotatable within the sockets formed in the said hinge members; and screws passing through holes formed in the lids and having ends threaded into the opposed walls defining the channel formed in the associated hinge member.

References Cited by the Examiner

UNITED STATES PATENTS

| 289,599 | 12/1883 | Bacon | 16—128 |
| 2,607,411 | 8/1952 | Van Vliet | 160—231 |
| 2,691,187 | 10/1954 | Lorenz | 160—231 |
| 2,831,537 | 4/1958 | Ritter | 160—201 |
| 3,053,318 | 8/1962 | Artman | 160—231 |

HARRISON R. MOSELEY, *Primary Examiner.*

P. M. CAUN, *Assistant Examiner.*